Figure 1:
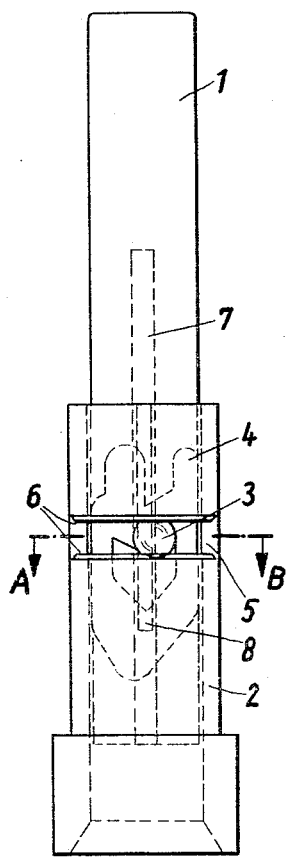

Feb. 7, 1967  E. SCHODTERER  3,302,619

BALL PRESSURE MECHANISM FOR PENS

Filed June 4, 1965

Inventor:
Erich Schodterer
BY:
H. Edward Mestern 3,302,619
BALL PRESSURE MECHANISM FOR PENS
Erich Schodterer, Erbach, Odenwald, Germany, assignor to Jacob Ritter Kom. Ges., Brensbach, Odenwald, Germany
Filed June 4, 1965, Ser. No. 461,420
Claims priority, application Germany, June 27, 1964, R 38,240
2 Claims. (Cl. 120—42.03)

The invention relates to ball pressure mechanisms for writing implements having longitudinally adjustable fillers, especially for ball point pens. The invention is based on a mechanism as described in the U.S.A. Patents 3,084,670, 3,084,671 and 3,100,403.

In such mechanisms, the adjusting and sealing means consist of a sphere which is disposed bisectionally force-lockingly between a notch within the pressure pin and a notch or groove in the jacket surrounding the pressure pin, whereby one of the grooves or notches is a horizontal transverse slot, and the other, in longitudinal direction, is a vertical slot provided with stops, e.g., in the shape of a heart-shaped groove. In lieu of a ball or sphere other roll bodies can be employed as adjusting and sealing element. The ball pressure mechanisms forming a small tension device are much superior to other adjustable mechanisms. However, their assembly has the drawback that the insertion of the sphare between the two grooves is not feasible, and that therefore it generally is necessary to manufacture either the jacket or the pressure pin from two parts for the formation of one of the two grooves. After completed assembly, a free space remains which forms the notch or groove. As an alternative, the groove can be manufactured by cutting.

It is the object of the invention to introduce a new manufacture of ball pressure mechanisms which permits, in a simple manner, the insertion of the sphere between the guiding notches, whereby the drawbacks named above are avoided. According to the invention, a mechanism as described is utilized in which the longitudinal groove in the pressure pin and the horizontal groove in the jacket are disposed in an elastically yielding material, such as a plastic. The salient feature of the invention resides in the fact that in the pressure pin a groove is present which, as known per se, may be heart-shaped or oblong, while the jacket is provided with a perforation in form of a slit extending along a portion, preferably half the circumference, of the jacket, and corresponding to the diameter of the rolled body. However, the slit narrows somewhat toward the outside. After insertion of the pressure pin in a suitable manner, e.g., by means of a longitudinal guide secured against rotation, into the jacket, this groove forms the horizontal slot, and the sphere is pressed into it from the outside while overcoming the constriction.

The novel mechanism distinguishes from the pressure mechanisms known to date in principle by the fact that the horizontal guidance of the sphere is not a groove closed at the outside, but a horizontal slit, open to the outside, in the jacket. The height of the slit corresponds to the sphere diameter so that the latter can roll freely; however, the slot must narrow toward the outside so that the sphere cannot drop out of the slot or slit. Naturally, the constriction must be dimensioned so that the sphere upon application of pressure can be pressed into the constricted, elastically yielding slit limits from the outside. Such a mechanism is very simple in construction and is inexpensive with respect to the manufacture of the component parts and with respect to assembly. The pressure pin as well as the jacket can be extruded or injection-molded in one piece. The invention has the further advantage that it can be employed with most ball point pens provided with adjustable filler regardless of make.

The invention now will be further explained with reference to the accompanying drawings which show preferred embodiments thereof.

Figure 3:
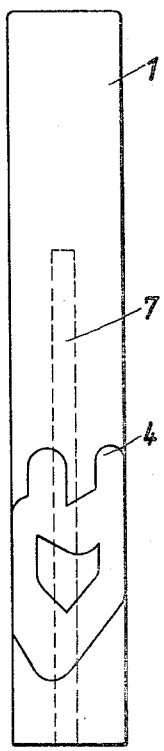
Figure 4:
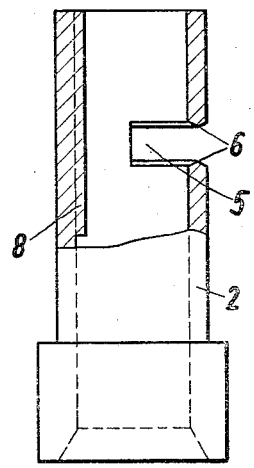
Figure 2:
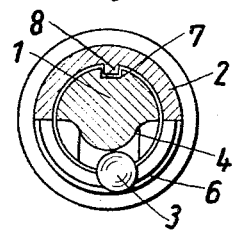
Figure 5:
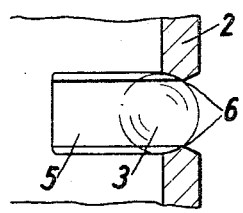

In the drawings,
FIG. 1 is schematic of the total mechanism;
FIG. 2 is a section along line A–B of FIG. 1;
FIGS. 3, 4 and 5 illustrate single parts of the mechanism.

Referring now to these drawings:
The mechanism shown in FIGS. 1 and 2 consists of pressure pin 1, a jacket 2 and a sphere 3, serving as adjusting and locking element.

In pressure pin 1 (see also FIG. 3) a heart-shaped groove is provided as longitudinal slot. In lieu of the heart-shape, an oblong or any other shape can be employed. In jacket 2 a horizontal perforation in the form of a slit is provided (see also FIGS. 4 and 5) which has a constriction 6, but otherwise is dimensioned so in height that, after insertion of pressure pin 1 into jacket 2, a slot forms in which sphere 3 can roll freely. The insertion of the sphere into the mechanism is carried out by pressing it through constriction 6 whose edges yield elastically upon pressing the sphere in. Once the sphere is inserted in the mechanism, it sits in perforation 5, which is limited on the inside by the pressure pin, just as in a groove which is closed to the outside since the constriction 6 protects the sphere from falling out.

Since the longitudinal groove 4 and the horizontal slot 5 must correspond to each other at each position of the parts, it is necessary that pressure pin 1 is guided in the jacket 2 without rotating. In the present instance (see FIG. 2), a longitudinal groove 7 is provided on pressure pin 1 and a corresponding flange 8 on the inside of jacket 2.

What is claimed is:
1. In a writing implement having a tubular body with a writing end and an opposite end, writing means longitudinally slidable in said body between writing and retracted position, spring means in the body urging the writing means toward retracted position, means for releasably locking the writing means, and locking means mounted on said opposite end, the improvement which comprises, in combination, in said tubular body a jacket having a horizontal perforation in the form of a slit constricted toward the outside of said jacket and capable of elastically yielding under pressure; a pressure pin having a longitudinal groove corresponding in all positions to said slit; said groove crossing said slit; a roll body inserted, and freely moving, in the hollow formed by the crossing of said groove and said slit after insertion therein.
2. The mechanism as defined in claim 1, wherein rotation of said pressure pin in said jacket is precluded by providing a longitudinal second groove on the outside of said pressure pin and a corresponding flange on the inside of said jacket.

References Cited by the Examiner
UNITED STATES PATENTS

| 2,558,958 | 9/1951 | Jandus et al. | 74—503 |
| 2,972,980 | 2/1961 | MacDonald | 120—42.03 |
| 3,084,670 | 4/1963 | Dottinger | 120—42.03 |
| 3,084,671 | 4/1963 | Dottinger | 120—42.03 |
| 3,100,403 | 8/1963 | Dottinger | 120—42.03 |

FOREIGN PATENTS

| 1,091,233 | 10/1954 | France. | |

LAWRENCE CHARLES, *Primary Examiner.*